W. HADWIN.
BALING SHORT CUT HAY OR STRAW.
No. 112,140. Patented Feb. 28, 1871.
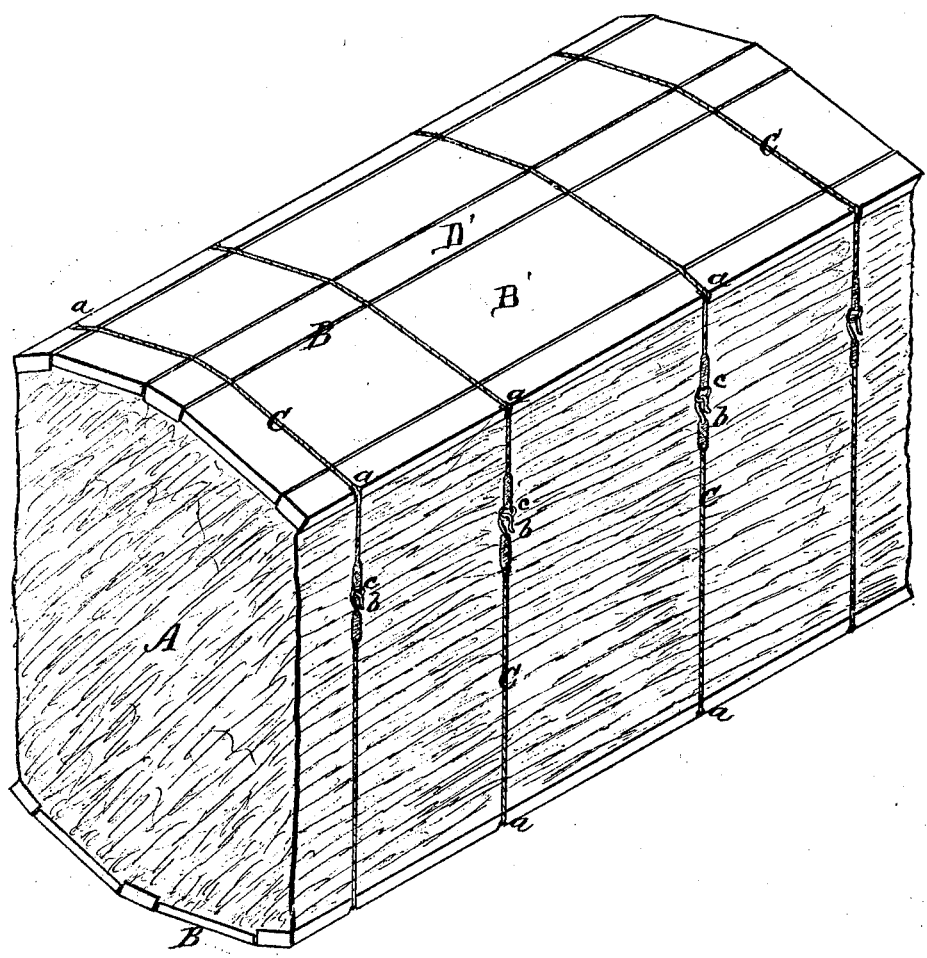
Witnesses.
H. D. McNaughton
R. F. Osgood
Inventor:
William Hadwin
By J. Fraser & Co.
attys
Rochester, N.Y.

UNITED STATES PATENT OFFICE.

WILLIAM HADWIN, OF ROCHESTER, NEW YORK, ASSIGNOR TO HIMSELF AND ISAAC S. WILSON.

IMPROVEMENT IN BALING SHORT-CUT HAY OR STRAW.

Specification forming part of Letters Patent No. 112,140, dated February 28, 1871.

*To all whom it may concern:*

Be it known that I, WILLIAM HADWIN, of the city of Rochester, in the county of Monroe and State of New York, have invented a certain new and useful Improvement in Baling Short-Cut Hay or Straw, of which the following is a specification:

Nature of the Invention.

This invention consists in baling short-cut feed with a wood covering on two opposite sides, held in place by means of cords and hooks, as will be hereinafter more fully described.

The invention is also applicable to baling short-cut straw for transportation to paper-mills.

General Description.

In the drawing the figure represents a perspective view of my improvement.

A is the bale of cut feed, and B B the wood covering or roof upon two opposite sides. This covering consists of a series of thin boards or slats, extending the whole length of the bale, and fitted closely together, so as to form a complete roof, as shown. The pieces are preferably arranged in alternate wide and narrow lengths, B' and D', respectively, so that while the best effect of shedding the water is produced, the covering is yet flexible and yielding, to allow the bale to be rolled and moved. The outer strips are notched, as shown at *a a*, to receive the binding-cords C C, which are passed around the bale and connected at the ends by hooks and eyes *b c*. These notches hold the cords, and the latter keep the covering in place. The natural elasticity of the bale will allow the hooks and eyes to connect, and the reaction will keep the cords straight or taut.

Short-cut feed has been before bound by a covering of long straw or paper, with stiffening-slats placed on top and bound by cords. The objection to straw is, that it gets torn and separated, so that the feed will escape. It is also difficult to get in cities, where hay is principally baled. The objection to paper is, that it is very frail, easily torn, and spoiled if it becomes wet; and a great objection to both is, that they serve as no shield against wet weather, but the feed becomes spoiled when exposed.

By my improvement these difficulties are obviated. The wood covering is strong, and will bear moving and rolling about. Its flexibility allows it to yield under motion. It does not easily become broken or open to allow the contents to escape, and it serves as a perfect shield against the weather by presenting a roof to the rain. It also dispenses with the outside slats or stays, as the covering combines the necessary stiffness in itself. It is also in a form where the envelope can be packed and returned to the place of shipment for use a second time.

The boarding may also be made so thin and light that is very cheap.

Claim.

In bales for short-cut hay or straw, the continuous wood covering on two opposite sides of the bale, composed of the series of wide and narrow slats B' and D', placed with their edges in contact, and held in position by the cords C, as herein shown and described, for the purposes specified.

WILLIAM HADWIN.

Witnesses:
R. F. OSGOOD,
H. D. McNAUGHTON.